(12) United States Patent
Aad et al.

(10) Patent No.: US 9,277,364 B2
(45) Date of Patent: Mar. 1, 2016

(54) METHODS AND APPARATUS FOR REPORTING LOCATION PRIVACY

(75) Inventors: Imad Aad, Bottens (CH); Igor Bilogrevic, Renens VD (CH); Kevin Huguenin, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 487 days.

(21) Appl. No.: 13/531,908

(22) Filed: Jun. 25, 2012

(65) Prior Publication Data

US 2013/0344884 A1    Dec. 26, 2013

(51) Int. Cl.
*H04W 24/00* (2009.01)
*H04W 4/02* (2009.01)
*H04W 12/02* (2009.01)

(52) U.S. Cl.
CPC .............. *H04W 4/028* (2013.01); *H04W 12/02* (2013.01)

(58) Field of Classification Search
CPC ........ H04W 64/00; H04W 4/02; H04W 48/04
USPC .............................................. 455/456.1, 457
See application file for complete search history.

(56) References Cited

U.S. PATENT DOCUMENTS

| | | | |
|---|---|---|---|
| 7,133,838 B2 | 11/2006 | Tokuma | 705/26 |
| 7,478,157 B2 | 1/2009 | Bohrer et al. | 709/226 |
| 7,487,363 B2 | 2/2009 | Alve et al. | 713/193 |
| 2002/0019817 A1 | 2/2002 | Matsui et al. | 707/1 |
| 2002/0173295 A1 | 11/2002 | Nykanen et al. | 455/414 |
| 2002/0188563 A1 | 12/2002 | Isaji et al. | 705/41 |
| 2003/0110076 A1 | 6/2003 | Holt | 705/14 |
| 2004/0176104 A1 | 9/2004 | Arcens | 455/456.3 |
| 2004/0215517 A1 | 10/2004 | Chen et al. | 705/14 |
| 2005/0075116 A1* | 4/2005 | Laird et al. | 455/456.3 |
| 2005/0171917 A1 | 8/2005 | Femenia et al. | 705/80 |
| 2006/0259950 A1 | 11/2006 | Mattsson | 726/1 |
| 2007/0143824 A1 | 6/2007 | Shahbazi | 726/1 |
| 2008/0196083 A1 | 8/2008 | Parks et al. | 726/1 |
| 2008/0215509 A1 | 9/2008 | Charlton | 706/11 |
| 2009/0025057 A1 | 1/2009 | Mattsson | 726/1 |
| 2009/0300716 A1 | 12/2009 | Ahn | 726/1 |
| 2009/0307743 A1 | 12/2009 | Azagury et al. | 726/1 |
| 2009/0328135 A1 | 12/2009 | Szabo et al. | 726/1 |

(Continued)

FOREIGN PATENT DOCUMENTS

| | | | |
|---|---|---|---|
| JP | 2006235984 A | 9/2006 | |
| JP | 2010097336 A | 4/2010 | |

(Continued)

OTHER PUBLICATIONS

"Secure My Wireless Blog", Verizon Wireless to Sell Customers' Data to Advertisers, Oct. 21, 2011, 2 pgs.

(Continued)

*Primary Examiner* — Temica M Beamer
(74) *Attorney, Agent, or Firm* — Harrington & Smith

(57) ABSTRACT

Privacy evaluation in a mobile electronic device. Location data collected by one or more applications operating on the electronic device is evaluated to determine the precision with which a user's location and movements can be reconstructed based on the location data collected by one or more of the applications. Information relating to such precision may be presented to the user, suitably by a graphic display representing a circle or ellipse within which the user's movement cannot be determined or a set of streets within which the user's movement cannot be determined.

18 Claims, 4 Drawing Sheets

(56) References Cited

U.S. PATENT DOCUMENTS

| | | | |
|---|---|---|---|
| 2010/0077484 A1 | 3/2010 | Paretti et al. | 726/26 |
| 2010/0257577 A1 | 10/2010 | Grandison et al. | 726/1 |
| 2011/0030067 A1 | 2/2011 | Wilson | 726/27 |
| 2011/0225200 A1 | 9/2011 | Danis et al. | 707/783 |
| 2011/0256881 A1* | 10/2011 | Huang et al. | 455/456.1 |
| 2011/0307600 A1 | 12/2011 | Polley et al. | 709/224 |
| 2013/0035944 A1 | 2/2013 | Hurwitz et al. | 705/1.1 |

FOREIGN PATENT DOCUMENTS

| | | |
|---|---|---|
| WO | WO-2009/079403 A1 | 6/2009 |
| WO | WO-2010/103177 A1 | 9/2010 |

OTHER PUBLICATIONS

"A Window Into Mobile Device Security", Carey Nachenberg, Symantec™, 2011, 23 pgs.

"Windows Phone 7 Guides for IT Professionals", http://www.microsoft.com/download/en/details.aspx?displaylang=en&id=8842; Dec. 21, 2011, 2 pgs.

"TaintDroid: An Information-Flow Tracking System for Realtime Privacy Monitoring on Smartphones", William Enck et al., In proceedings of the $9^{th}$ USENIX Symposium on Operating Systems Design and Implementation (OSDI), 2010, 15 pgs.

"Some Android apps caught covertly sending GPS data to advertisers", Ryan Paul, Dec. 21, 2011, 2 pgs.

"Study Shows Some Android Apps Leak User Data Without Clear Notifications", Priva Ganapati, Gadget Lab, Sep. 30, 2010, 3 pgs.

"Your Apps Are Watching You", Scott Thurm et al., The Wall Street Journal, Dec. 21, 2011, 5 pgs.

"PiOS: Detecting Privacy Leaks in iOS Applications", Manuel Egele et al., 2011, 15 pgs.

LBE Privacy Guard for Android Monitors Access Requests, Guards Privacy:, Sameed, May 28, 2011, 4 pgs.

"Protect Your Most Personal Device", 1022 Mobile Threat Report, Lookout Mobile Security, Dec. 21, 2011, 3 pgs.

\* cited by examiner

METHODS AND APPARATUS FOR REPORTING LOCATION PRIVACY

TECHNICAL FIELD

The present invention relates generally to uses for portable electronic devices. More particularly, the invention relates to mechanisms for evaluating and reporting privacy implications of information relating to the use of a portable electronic device.

BACKGROUND

Electronic devices are becoming more and more capable and more and more indispensable. For some users, being without the instant communication provided by Internet-capable electronic devices is inconceivable. Such users make sure that their devices are always turned on and, if they are using devices that allow battery replacement, that they have at least one spare battery available.

Many other users, even those who are not constantly engaged with their devices usually have their devices turned on, and many applications run in the background whenever a device is turned on. Many background applications, and other applications, collect location data of users. Weather applications, for example, need to know a user's location within a broad radius to select weather reports relevant to the user. Map applications often need to know the user's precise location to provide location information and directions to the user. Applications identifying points of interest can operate more seamlessly for the user if they have updated location information for the user. Therefore, many applications periodically poll the user's device for location information. Depending on the components that the user has enabled, the location information may be more or less precise. For example, location information may be computed based on the proximity of a base station, such as an eNodeB (eNB) to a user device, which may be a user equipment (UE). Such information is often relatively imprecise. Under other circumstances, location information may be determined based on a device's global positioning system component, and this information is often relatively precise.

SUMMARY

According to one embodiment of the invention, an apparatus comprises at least one processor and memory storing computer program code. The computer program code is configured to, with the memory and the at least one processor, cause the apparatus to at least evaluate location data collected by at least one application operating on a user device to determine an uncertainty with which the location data represents at least one of location of the device and movement of the device over time.

In another embodiment of the invention, a method comprises evaluating location data collected by at least one application operating on a user device to determine an uncertainty with which the location data represents at least one of location of the device and movement of the device over time.

In another embodiment of the invention, a computer readable medium stores a program of instructions. Execution of the program of instructions by a processor configures an apparatus to at least evaluate location data collected by at least one application operating on a user device to determine an uncertainty with which the location data represents at least one of location of the device and movement of the device over time.

DETAILED DESCRIPTION

Embodiments of the present invention recognize that concerns about user privacy, and how the gathering of user personal information by devices and the use of this information by applications affects user privacy, are growing. An application may poll a user's location and receive information defining a point at which the user is located, but periodic polling may define a succession of points, and analysis of such a succession of points may be used to reconstruct a user's path of travel if the user is traveling. Location information collected by applications can be sent to advertising companies and some applications may be provided by criminals who wish to collect information that can be sent to them or to others without the user's consent.

Embodiments of the present invention further recognize that reconstructing a user's path depends on the user's speed, the sampling rate, the topology of the terrain through which the user is traveling, and the precision with which each sample is taken. In one or more embodiments of the present invention, the information provided to a particular application is analyzed and used to determine the precision with which a user's path can be determined, based on the information that has so far been obtained.

Figure 1:
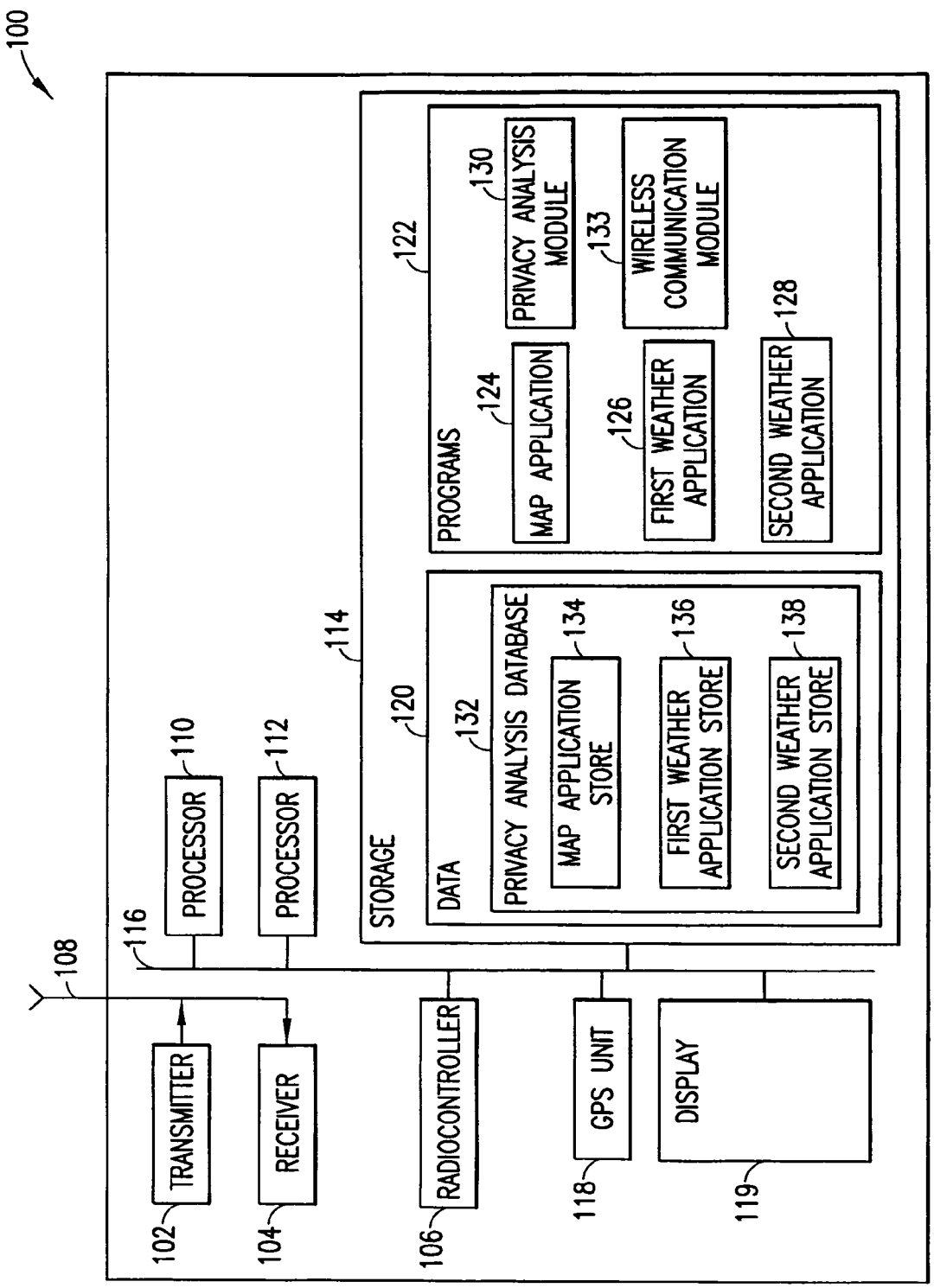
FIG. 1 illustrates a user device according to an embodiment of the present invention.

FIG. 1 illustrates a user device 100, which may be a user equipment (UE) capable of operating in a wireless cellular communication network. The UE comprises a transmitter 102, receiver 104, radio controller 106, and antenna 108. The UE 100 further comprises a processor 110, memory 112, and storage 114, communicating with one another and with the radiocontroller 106 over a bus 116. The UE 100 may further comprise a global positioning system (GPS) unit 118 and a display 119, which may suitably be a touch screen display, and may employ data 120 and programs 122, suitably residing in storage 114 and transferred to memory 112 as needed for execution by the processor 110.

Among the programs 122 may be a map application 124, first weather application 126, second weather application 128, and privacy analysis module 130. The privacy analysis module 130 suitably directs the gathering of data collected applications collecting location information, such as the map application 124 and first and second weather applications 126 and 128, and stores it in a privacy analysis database 132.

The map application 124 and first and second weather applications 126 and 128 can be expected to periodically poll the device 100 for user location data, which may be provided, for example by the GPS unit 118, or by a wireless communication module 133, embodied as part of the software 122. The wireless communication module 133 may determine location information based on a determination of the base station or base stations in the vicinity of the device 100 and their locations.

The privacy analysis module 130 directs storage of location information in the database 132, and in the present exemplary case may store it separately for each of the applications, such as in a map application store 134, a first weather application store 136, and a second weather application store 138.

Over time, each of the applications 124-128 polls location data, and the The user installs an application on his mobile device. The application polls the user's location, and the privacy analysis module 130 intercepts the polling and stores it the privacy analysis database 132, in the data store specified for the application. Separate data stores are illustrated here for ease of description, but it will be recognized that actual separate data stores are not needed, and any mechanism for distinguishing data collected by one application from data collected by another application will serve a similar purpose to the use of separate data stores. It will also be recognized that separate identification of data collected by each application is not essential, and that the use of such separate identification is a matter of design choice, and, further, that the same device may at different times perform privacy analysis with or without separately identifying data collected by different applications.

Data collected and stored in each data store may, for example, take the following form:
Timestamp, Longitude, Latitude, HorizAcc
t1, long1, lat1, HorizAcc1
t2, long2, lat2, HorizAcc2
t3, long3, lat3, HorizAcc3
.
.
.
tn, longn, latn, HorizAccn Suppose that a user wishes to know his instantaneous privacy level with respect to a particular application at an instant t, where t2<t<t3. The application has stored the users location at t2 with an accuracy of HorizAcc2. The maximum possible speed at which the user was previously moving between t2 and t1 can be calculated as follows. Let vmax be the maximum possible speed.

Then, vmax=max(dist(long1; lat1; long2; lat2)/(t2−t1))). The user's location at time t is therefore know within a "confusion area" defined by a circle of radius HorizAcc2+vmax×(t−t2). The confusion area, and, thus, the radius of the circle, increases with time (until the application requests a new sample at t3), centered at the position detected at t2.

dist(long1; lat1; long2; lat2) can be computed as:

$$dist(long1,lat1,long2,lat2)=6371000*c;$$

where $$c=2\times a\tan 2(sqrt(a),sqrt(1-a));$$

$$a=\sin((lat2-lat1)/2)^2+\cos(lat2)\times\cos(lat1)\times\sin((lon2-lon1)/2)^2;$$

The "maximum possible" speed vmax=max(v) can be computed as:
if(v<1.111) vmax=1.111; # pedestrian @4 Km/hr
else if(v>=1.111 && v<5.555) vmax=5.555; # bike @20 Km/hr
else if(v>=5.555 && v<8.333) vmax=8.333; # car @30 Km/hr
else if(v>=8.333 && v<13.888) vmax=13.888; # car @50 Km/hr
else if(v>=13.888 && v<33.333) vmax=33.333; # car @120 Km/hr
else vmax=250; # airplane @900 Km/hr Numerous alternative approaches are possible. For example, it may be desired to use a more smoothing computational approach.

For convenience, at t1, a time before which no previous speeds have been computed, it can be assumed that vmax=1.111 and that the user is a pedestrian.

After t3, the user can check his personal privacy level between t1 and t3. That is, the user can see the confusion level experienced by the application over the three location samples. Between the samples at t1 and t2, the confusion level corresponds to the area within which the user could have traveled at vmax, starting at (long1, lat1) and ending (long2, lat2). This corresponds to the ellipse with focus points (long1, lat1) and (long2, lat2), where the orbital distance to the focuses is vmax x(t2−t1). The orbital distance may be assumed to be constant.

From this information, the radii of the ellipse can be calculated:

$$orbdist=vmax\times(t2-t1);$$

$$r1=orbdist/2;$$

$$r2=sqrt(orbdist^2/4)-dist(long1,lat1,long2,lat2)/4$$

dist( ) remains as previously defined.

The value of vmax may be computed after each sample, applying it to the time between samples, and used for an estimation of the confusion level over the time between the most recent sample and the next sample.

Figure 2:
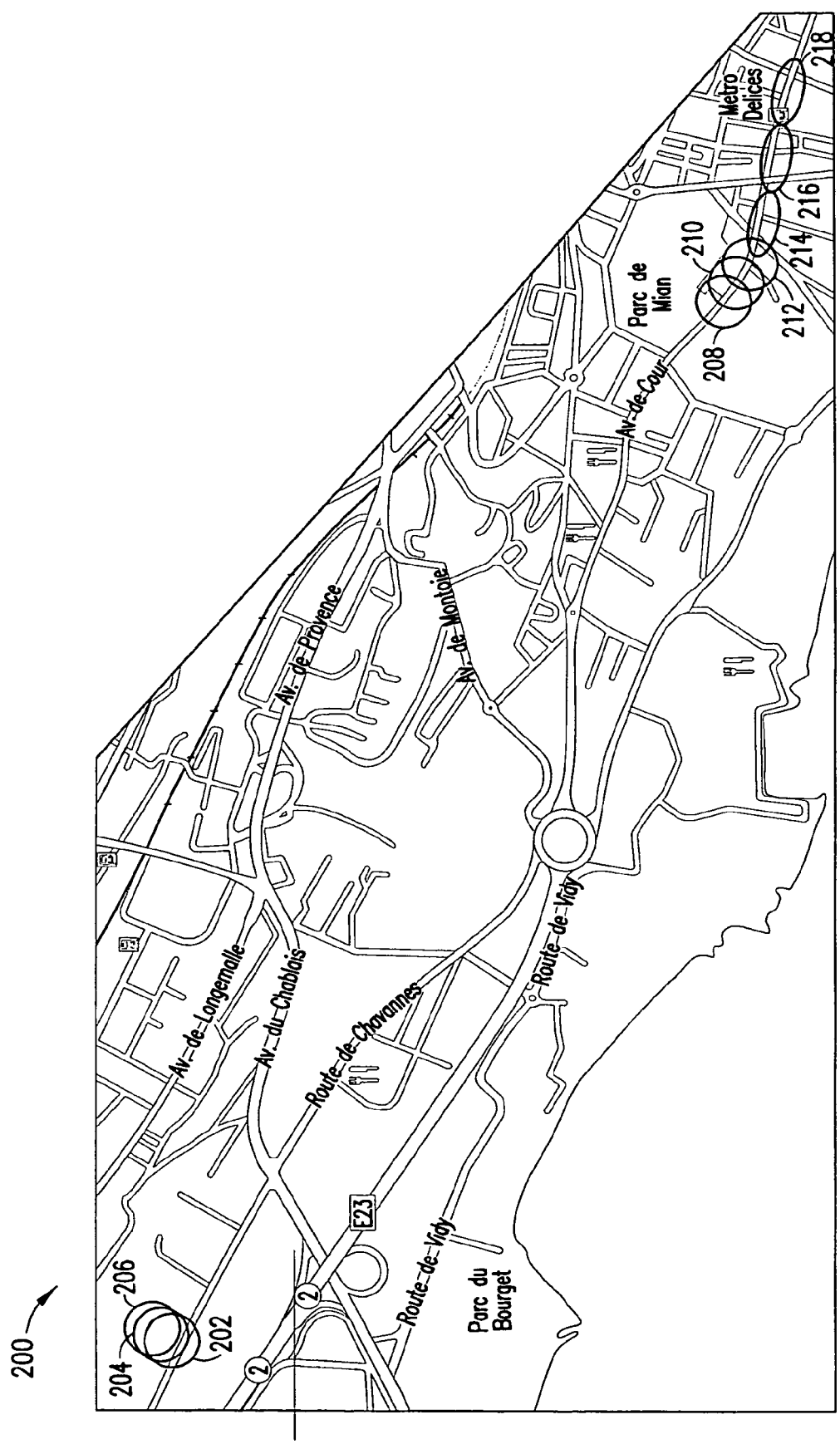
FIGS. 2 and 3 illustrate displays providing visual indications of privacy monitoring results according to one or more embodiments of the present invention.

FIG. 2 illustrates a map display 200 according to an embodiment of the present invention. Confusion circles 202, 204, 206, and other overlapping circles in the same area illustrate a user in a relatively constant position with the user's location determined over each several samples. One circle indicates a user's possible range of movements over an interval between two samples. Confusion circles 208, 210, and 212, may indicate uncertainty relating to a walking user who is approaching an automobile. Once the user enters the automobile, ellipses, such the ellipses 214, 216, and 218, indicate confusion areas during driving, with an ellipse being calculated knowing a maximum speed that corresponds to the user's means of transportation. The visualization can further include a confusion level, given N location samples, that is the weighted average of the sizes of the corresponding ellipses. That is:

$$Pp=1/((N-1)\times(tN-t1))\times\Sigma i=1N-1(ti+1-ti)\times\Pi\times MaxPrecision2/Ai$$

Where Ai is the surface of ith ellipse (Ai=Π×r1×r2, where r1 and r2 are the ellipse radiuses), and MaxPrecision is the maximum location precision, for example, 2.2 meters, of the user's device, such as the device 100.

Figure 3:
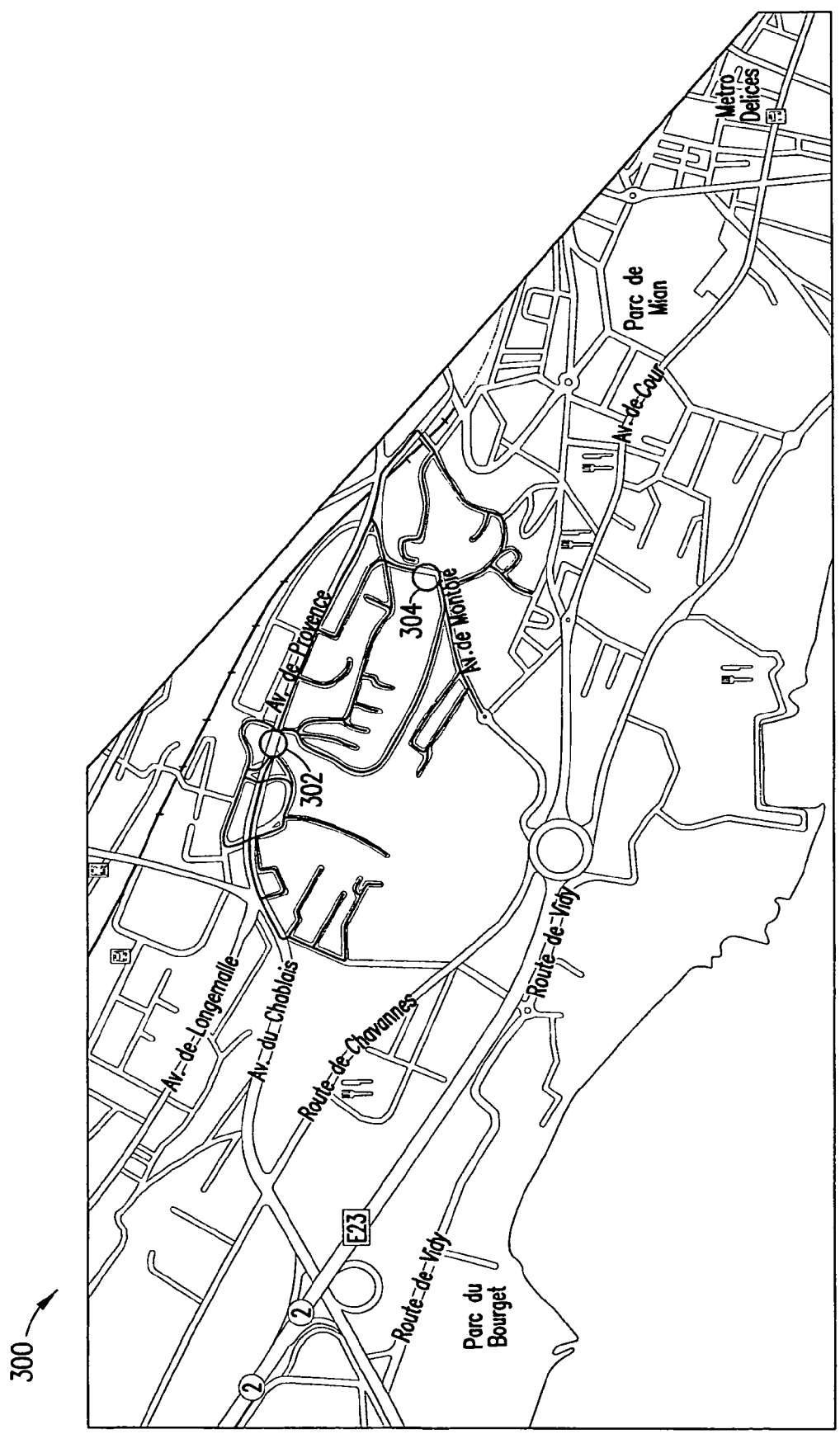

FIG. 2 presumes complete freedom of movement by a user, but in many cases a user's movements are more or less defined by streets. FIG. 3 illustrates a map view 300 showing sample locations 302 and 304. A set of streets between sampled locations is highlighted representing the user's possible movements between sampling times.

If information collected by each application is separately stored and analyzed, a user is able to compare privacy intrusion between applications and evaluate whether the needs of each application warrant the data collection. For example, if the first weather application 126 collects one or two samples per hour and the second weather application 128 collects one sample per second, a user may question whether the rate of collection by the second application 128 is required by weather reporting.

Figure 4:
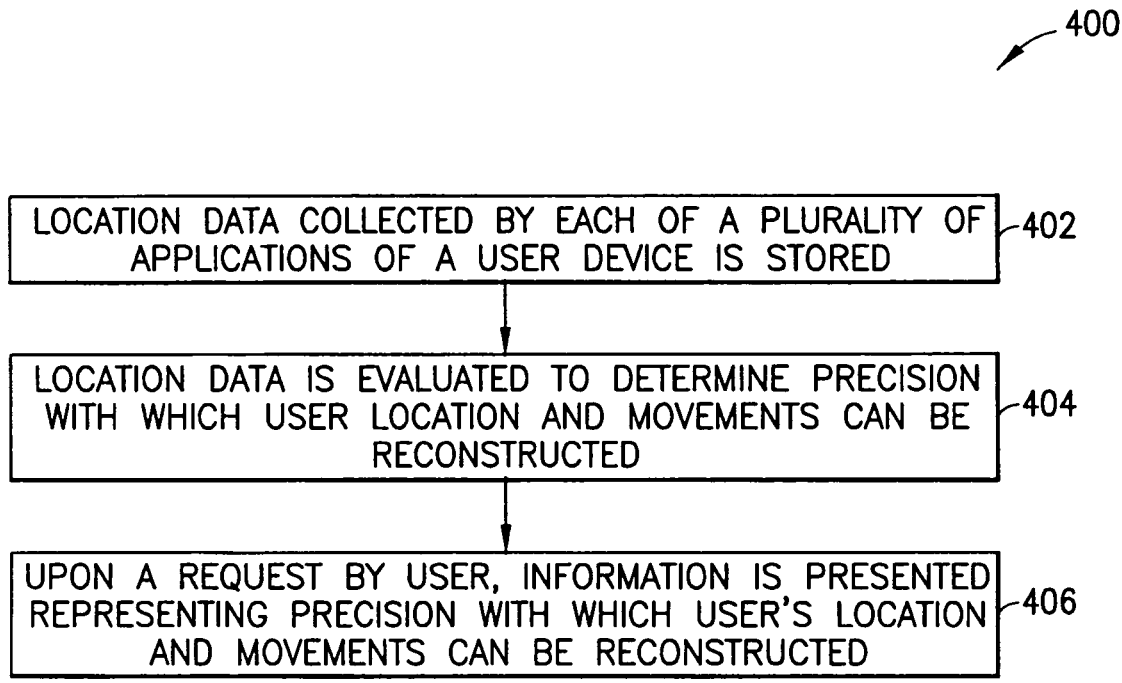
FIG. 4 illustrates a process according to an embodiment of the present invention.

FIG. 4 illustrates a process 400 according to an embodiment of the present invention. At step 402, as each of a plurality of applications collects location data for the user, the location data collected by each application is stored, for example, in the form of a time stamp, location information, and accuracy information. At step 404, the location data collected by each application is evaluated to compute the precision with which the user's location and movements can be reconstructed based on the data. At step 406, suitably upon a request by the user, information, such as a graphic display, is presented, representing the precision with which the user's location and movements can be reconstructed based on the information collected by the application.

At least one of the programs 122 in the device 100 is assumed to include a set of program instructions that, when executed by the associated processor 110, enable the device to operate in accordance with the exemplary embodiments of this invention, as detailed above. In these regards the exemplary embodiments of this invention may be implemented at least in part by computer software stored on the memory 112, which is executable by the processor 110 of the device 100, or by hardware, or by a combination of tangibly stored software and hardware (and tangibly stored firmware). Electronic devices implementing these aspects of the invention need not be the entire device as depicted at FIG. 1, but may be one or more components of same such as the above described tangibly stored software, hardware, firmware and processor, or a system on a chip (SOC) or an application specific integrated circuit (ASIC.)

In general, the various embodiments of the device can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable memory 112 and storage 114 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 110 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
    at least one processor;
    memory storing computer program code;
    wherein the computer program code is configured to, with the memory and the at least one processor, cause the apparatus to at least:
    evaluate location data collected by at least one application operating on a user device and collect location information for the user device for delivery to another party, wherein the evaluation determines an uncertainty with which the location data represents at least one of location of the device and movement of the device over time, wherein the location data comprises a plurality of timestamped location samples collected as the application periodically polls a location determination device over time, and wherein evaluation is performed by determining the uncertainty with which one or more of location and movement can be reconstructed using the information provided by the samples; and
    configure a graphical representation of the uncertainty for presentation using a display of the device.

2. The apparatus of claim 1, wherein the location data comprises at least two location samples collected at time intervals.

3. The apparatus of claim 2, wherein the uncertainty is computed based at least in part on a maximum speed of the device between samples.

4. The apparatus of claim 1, wherein the at least one application comprises a plurality of applications, and wherein location data collected by each application is evaluated separately from that collected by the other applications.

5. The apparatus of claim 1, wherein the graphical representation of the uncertainty comprises at least one of a circle and an ellipse.

6. The apparatus of claim 1, wherein the location data comprises at least two location samples collected at time intervals and wherein the graphical representation of the uncertainty comprises a representation of a set of streets where the user might have been located during an interval between samples.

7. A method comprising:
    evaluating location data collected by at least one application operating on a user device to determine an uncertainty with which the location data represents at least one of location of the device and movement of the device over time, wherein the location data comprises a plurality of timestamped location samples collected as the application periodically polls a location determination device over time, and wherein evaluation is performed by determining the uncertainty with which one or more of location and movement can be reconstructed using the information provided by the samples; and
    configuring a graphical representation of the uncertainty for presentation using a display of the device.

8. The method of claim 7, wherein the location data comprises at least two location samples collected at time intervals.

9. The method of claim 8, wherein the uncertainty is computed based at least in part on a maximum speed of the device between samples.

10. The method of claim 7, wherein the at least one application comprises a plurality of applications, and wherein location data collected by each application is evaluated separately from that collected by the other applications.

11. The method of claim 7, wherein the graphical representation of the uncertainty comprises at least one of a circle and an ellipse.

12. The method of claim 7, wherein the location data comprises at least two location samples collected at time intervals and wherein the graphical representation of the uncertainty comprises a representation of a set of streets where the user might have been located during an interval between samples.

13. A non-transitory computer readable medium storing a program of instructions, execution of which by a processor configures an apparatus to at least:
    evaluate location data collected by at least one application operating on a user device to determine an uncertainty with which the location data represents at least one of location of the device and movement of the device over time, wherein the location data comprises a plurality of timestamped location samples collected as the application periodically polls a location determination device over time, and wherein evaluation is performed by determining the uncertainty with which one or more of location and movement can be reconstructed using the information provided by the samples; and configure a graphical representation of the uncertainty for presentation using a display of the device.

14. The computer readable medium of claim 13, wherein the location data comprises at least two location samples collected at time intervals.

15. The computer readable medium of claim 14, wherein the uncertainty is computed based at least in part on a maximum speed of the device between samples.

16. The non-transitory computer readable medium of claim 13, wherein the at least one application comprises a plurality of applications, and wherein location data collected by each application is evaluated separately from that collected by the other applications.

17. The non-transitory computer readable medium of claim 13, wherein the graphical representation of the uncertainty comprises at least one of a circle and an ellipse.

18. The non-transitory computer readable medium of claim 13, wherein the location data comprises at least two location samples collected at time intervals and wherein the graphical representation of the uncertainty comprises a representation of a set of streets where the user might have been located during an interval between samples.

\* \* \* \* \*